US009617698B1

(12) United States Patent
Stiles

(10) Patent No.: US 9,617,698 B1
(45) Date of Patent: Apr. 11, 2017

(54) PERMEABLE PAVER AND MODULAR LIGHT SYSTEM

(71) Applicant: STILES MANUFACTURING, LLC, Houston, TX (US)

(72) Inventor: Barry J. Stiles, Houston, TX (US)

( * ) Notice: Subject to any disclaimer, the term of this patent is extended or adjusted under 35 U.S.C. 154(b) by 0 days.

(21) Appl. No.: 15/255,853

(22) Filed: Sep. 2, 2016

Related U.S. Application Data

(60) Provisional application No. 62/272,261, filed on Dec. 29, 2015.

(51) Int. Cl.

| | | |
|---|---|---|
| *E01F 9/00* | (2016.01) | |
| *E01C 5/00* | (2006.01) | |
| *E01C 17/00* | (2006.01) | |
| *E01C 3/00* | (2006.01) | |
| *E01F 9/559* | (2016.01) | |
| *E01F 9/20* | (2016.01) | |
| *E01F 9/30* | (2016.01) | |
| *E01F 9/40* | (2016.01) | |
| *E01C 11/00* | (2006.01) | |
| *F21S 8/02* | (2006.01) | |
| *F21V 23/04* | (2006.01) | |
| *H05B 37/02* | (2006.01) | |

(Continued)

(52) U.S. Cl.
CPC ............... *E01F 9/559* (2016.02); *E01C 3/00* (2013.01); *E01C 5/00* (2013.01); *E01C 11/00* (2013.01); *E01C 17/00* (2013.01); *E01F 9/20* (2016.02); *E01F 9/30* (2016.02); *E01F 9/40* (2016.02); *F21S 8/022* (2013.01); *F21S 9/02* (2013.01); *F21V 15/01* (2013.01); *F21V 23/0407* (2013.01); *H05B 37/029* (2013.01)

(58) Field of Classification Search
CPC ..... E01F 9/559; E01F 9/20; E01F 9/30; E01F 9/40; E01C 5/00; E01C 17/00; E01C 11/00; E01C 3/00; E01C 2201/06; E01C 9/00; F21S 8/022; F21S 9/02; F21V 23/0407; F21V 15/01; H05B 37/029; H02S 20/21
USPC ............................. 52/223.7; 404/27–41, 16
See application file for complete search history.

(56) References Cited

U.S. PATENT DOCUMENTS 1,981,206 A * 11/1934 Strauss .................... E01F 9/553
180/168
3,310,906 A * 3/1967 Glukes ................. A63H 33/065
405/16

(Continued)

*Primary Examiner* — Abigail A Risic
(74) *Attorney, Agent, or Firm* — Wendy Buskop; Buskop Law Group, P.C.

(57) ABSTRACT

A permeable paver and modular light system for making a parking space or a traffic lane using at least one replaceable lighting module or a plurality of replaceable lighting modules, wherein the replaceable lighting module or the plurality of replaceable modules have at least one power supply and at least one light source. The permeable paver and modular light system have a controller configured to turn on and off the replaceable lighting module individually or as a group, change a color of the replaceable lighting module individually or as a group, illuminate a configuration of the replaceable lighting module individually or as a group based on a stored configuration, and change the illuminated configuration of the replaceable lighting module individually or as a group. The permeable paver and modular light system have a plurality of permeable pavers to form a surface for supporting a load of a vehicle.

20 Claims, 8 Drawing Sheets

(51) Int. Cl.
*F21S 9/02* (2006.01)
*F21V 15/01* (2006.01)

(56) References Cited

U.S. PATENT DOCUMENTS

| | | | | |
|---|---|---|---|---|
| 4,749,302 | A * | 6/1988 | DeClute | E01C 3/006 404/37 |
| 5,848,856 | A * | 12/1998 | Bohnhoff | E02B 11/00 405/36 |
| 6,027,280 | A * | 2/2000 | Conners | E01C 17/00 362/153.1 |
| 6,082,886 | A * | 7/2000 | Stanford | F21V 33/006 362/153.1 |
| 6,451,400 | B1 * | 9/2002 | Brock | A47L 23/24 15/161 |
| 6,622,440 | B2 * | 9/2003 | Mercade | A47L 23/24 52/177 |
| 6,755,550 | B1 * | 6/2004 | Lackey | F21S 8/024 362/147 |
| 7,070,294 | B2 * | 7/2006 | Patti | E01C 17/00 362/153 |
| 7,114,298 | B2 * | 10/2006 | Kotler | E01C 5/20 404/41 |
| 7,210,876 | B2 * | 5/2007 | Moralez | E01C 9/004 404/35 |
| 7,571,572 | B2 * | 8/2009 | Moller, Jr. | E01C 5/20 404/41 |
| 7,815,395 | B1 * | 10/2010 | Blackwood | E02B 11/00 405/43 |
| 7,950,191 | B2 * | 5/2011 | Brouwers | E01C 5/20 15/161 |
| 8,235,542 | B2 * | 8/2012 | Yohananoff | E01C 17/00 362/153 |
| 8,734,049 | B1 | 5/2014 | Stiles | |
| 9,169,607 | B2 * | 10/2015 | Schweizer | F21V 33/006 |
| 2008/0272278 | A1 * | 11/2008 | Shewa | F21S 8/022 250/206 |
| 2010/0109189 | A1 * | 5/2010 | Brouwers | E01C 5/820 264/239 |
| 2011/0013384 | A1 * | 1/2011 | Lu | F21S 8/022 362/183 |
| 2016/0301355 | A1 * | 10/2016 | Small | H02S 20/21 |

* cited by examiner

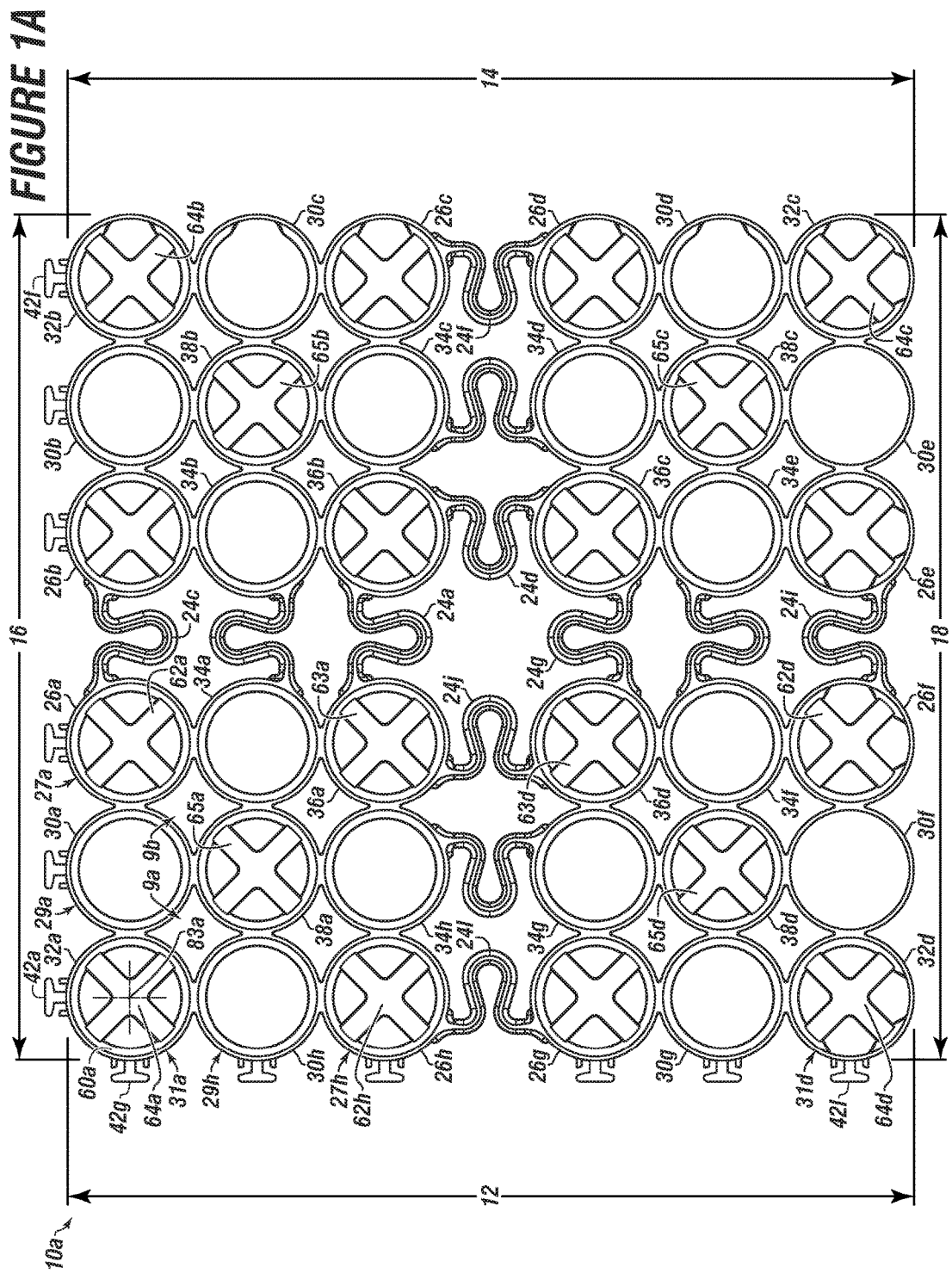

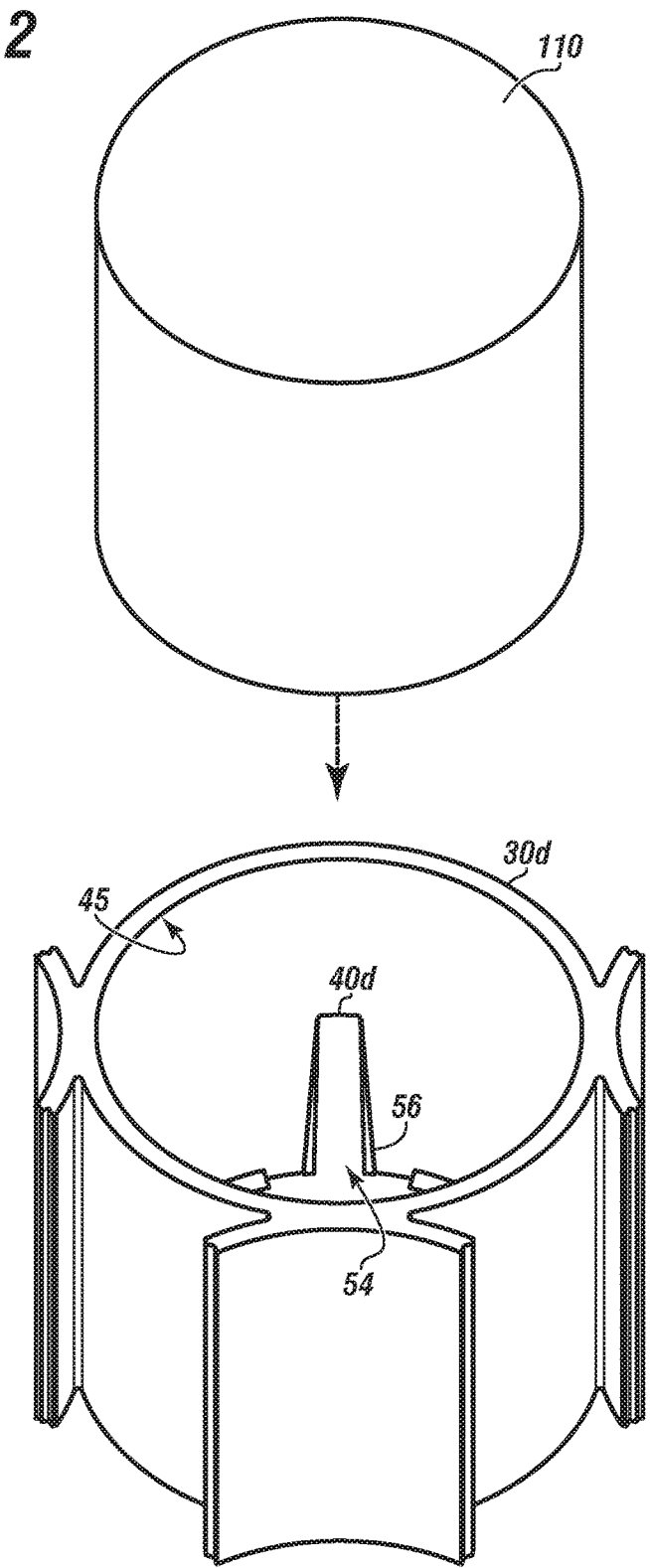

PERMEABLE PAVER AND MODULAR LIGHT SYSTEM

CROSS REFERENCE TO RELATED APPLICATION

The current application claims priority to and the benefit of U.S. Provisional Patent Application Ser. No. 62/272,261 filed on Dec. 29, 2015, entitled "MODULAR LIGHTING SYSTEM". This reference is hereby incorporated in its entirety.

FIELD

The present embodiments generally relate to a lighting system used to mark parking lots and thoroughfares.

BACKGROUND

A need exists for a permeable paver and modular light system with interconnected pavers for marking parking lots and thoroughfares that allows the identification of lanes, parking spots, and direction of traffic flow.

A further need exists for a permeable paver and modular light system with interconnected pavers, which can have a receiver and a transmitter in communication with a network for changing intensity of the light, making the light flash or blink, spelling out a message, supervising control for emergency vehicles, directing emergency vehicles, providing directions to a vehicle based on mobile phone application, which can indicate an open parking spot in a row, lane or lot, direct vehicles to parking spots, and connect to a revenue source.

The present embodiments meet these needs.

BRIEF DESCRIPTION OF THE DRAWINGS

The detailed description will be better understood in conjunction with the accompanying drawings as follows:

FIG. 1A depicts a top view of a paver according to one or more embodiments.

FIG. 2 depicts an exploded view of an outer three connection cell of the paver with at least one replaceable lighting module according to one or more embodiments.

Figure 1B:
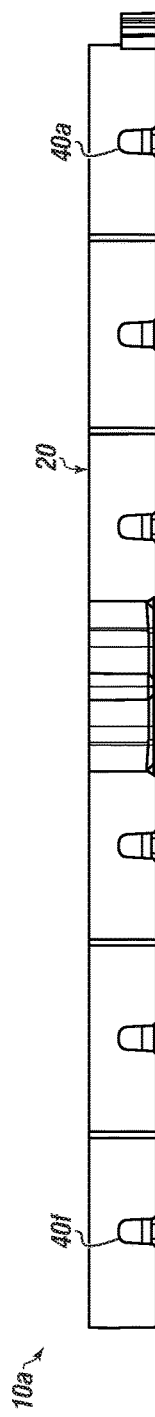
FIG. 1B depicts a side view of a second side of the paver according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a permeable paver and modular light system for marking parking lots and thoroughfares for forming a surface suitable for traffic.

The embodiments further relate to a permeable paver and modular light system that marks a parking lot space, a traffic lane, or a similar surface for vehicles.

The permeable paver and modular light system can have at least one replaceable lighting module or a plurality of replaceable lighting modules, wherein the at least one replaceable lighting module or the plurality of replaceable lighting modules can have a housing with at least one light source mounted within the housing.

The at least one replaceable lighting module or plurality of replaceable lighting modules can connect to a power supply, which can be connected to each light source.

In embodiments, the permeable paver and modular light system can be contained within the at least one replaceable lighting module.

The at least one replaceable lighting module or the plurality of replaceable lighting modules can connect to a controller, which can be in communication with the power supply and with the at least one replaceable lighting module or plurality of replaceable lighting modules.

The controller can be configured to turn on and off at least one replaceable lighting module or the plurality of replaceable lighting modules, change a color of at least one replaceable lighting module or the plurality of replaceable lighting modules, illuminate a configuration of at least one replaceable lighting module or the plurality of replaceable lighting modules based on a stored configuration, and change the illuminated configuration of at least one replaceable lighting module or the plurality of replaceable lighting modules In embodiments, a plurality of pavers can be used to support each replaceable lighting module. Each paver or plurality of pavers can have a plurality of connected cells forming sides, such as a first side, a second side, a third side, and a fourth side.

In embodiments, a plurality of locking tabs can be used and can extend from the first side and the third side.

A plurality of connected outer three connection cells, a plurality of outer two connection cells, and a plurality of outer flex joint connection cells can be used having spaces formed between the cells.

The cells and spaces can be configured to contain but are not limited to dirt, asphalt, concrete, gravel, grass, and combinations thereof.

In addition, to interlock the pavers together, a plurality of fastening slots can be formed partially through the cells that form the second side and the fourth side of the paver.

It should be noted that the plurality of locking tabs for a paver can engage the plurality of fastening slots of an additional paver.

The paver can be configured to form a surface for supporting a load, wherein each paver can be adapted to receive at least one replaceable lighting module of the plurality of replaceable lighting modules.

In embodiments, the paver can be made from recycled plastics, such as milk bottles.

In embodiments, the paver can be pigmented with soy based pigments to be environmentally friendly.

The process of installing the plurality of pavers can include clearing and grading a ground surface. The clearing and grading can be done by hand with a shovel for a small area or with a bulldozer for a large area.

The process can include laying and spreading from ½ an inch to 8 inches of ½ inch to 1.5 inch diameter rock or gravel onto the cleared and graded ground. The layer of rock or gravel can be compacted or compressed with a roller or compactor.

The process can include preassembling the pavers into interconnected paver, such as four pavers, with the plurality of locking tabs interlocking into the plurality of slots.

The process can include placing the preassembled pavers over the compacted or compressed rock or gravel.

The process can include dumping the aggregate into the cells of the interlocking or interconnected pavers. From ⅜ inch to 1.5 inch rock, recycled asphalt, or other aggregate can be used to evenly fill the cells.

The process can also include compacting the filled cells, forming a parking lot or surface, such as for vehicles or traffic.

After laying the pavers, the process can include filling the cells of the pavers with soil instead of aggregate and installing seed or sod as desired.

Foot paths can also be created with the pavers. Any size path can be made with the pavers.

The permeable paver and modular light system can not only provide a lighting system, but can provide a traffic lighting system and can also prevent erosion from flash flooding and thereby preventing injury and possible death from flash flooding, high water, and mudslides by facilitating management of water flow and drainage in areas that otherwise present solid surfaces with little or no ability to absorb water.

The permeable paver and modular light system not only provides user configurable parking spaces but can simultaneously help reduce rising temperatures from climate change and helps reduce environmental damage due to the dramatic heating effects caused by the use of concrete and asphalt roads, highways, freeways and parking surfaces.

A benefit of the permeable paver and modular light system is that it can help the environment by utilizing and recycling post-consumer and industrial waste that clog landfills. The interconnected plurality of pavers can use plastic trash, and recycles the plastic trash into a construction material usable to build parking lots, roadways, highways, freeways, sidewalks and other surfaces, such as golf cart trails, while simultaneously providing a changeable, versatile, colorable lighting system for vehicles, such as trucks, cars, bicycles, motorcycles and golf carts. Additionally, by using what otherwise becomes trash in waterways, the system prevents death of wildlife including turtles that might construe plastic to be jellyfish and die from eating the plastic bags which can become part of the fill of the novel system.

The permeable paver and modular light system can help improve lifestyles for the handicapped or disabled persons as well as improve lifestyles for the elderly by enabling the marking of handicapped spaces that can be more easily viewed.

A benefit of the permeable paver and modular light system is that it can help prevent accidents by providing directional safety arrows for parking lots and venues where individuals need extra indicators as drivers leave or enter crowded parking areas.

The permeable paver and modular light system for marking parking lots and thoroughfares can enable the construction of access ways that can be usable at night by providing inexpensive, natural grass and gravel, and Americans with Disabilities Act (ADA) compliant walkways that are well illuminated preventing injury from falls.

The permeable paver and modular light system can enable police and emergency responders to quickly install a roadway in a muddy area that is self-illuminating to quickly access a damaged area, where a permanent roadway was washed away.

The permeable paver and modular light system can provide illuminated roadways for use by emergency vehicles and fire trucks in areas where a concrete roadway or asphalt roadway would be dangerous and could cause death.

The term "configuration" as used herein can refer to a stored pattern that the light source in the permeable paver projects. The configuration in embodiments, can be less than the total number of light sources in the permeable paver, but can also be all of the light sources in the permeable paver. In embodiments, the configuration can be a specific design, such as "arrows" to indicate the location of an exit from a parking lot. In other embodiments, the configuration can be a series of parallel red lights to indicate that a driver should not park over that preset geographic area due to fire marshal restrictions.

The term "connected cells" as used herein can refer to the individual wall adjoining cells used to form a permeable paver.

The term "controller" as used herein can refer to a processor with a data storage or a circuit board with a variety of soldiered circuits installed thereon.

The term "data storage" as used herein refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "fastening slots" as used herein can refer to the slots that engage the locking tabs or another permeable paver. The fastening slots can be, for example, from 0.25 inch and 0.5 inch in width, and from 0.375 inch to 1.25 inches in height on the connected cell outer perimeter. Each connected cell on an outer perimeter of a permeable paver can have one or more fastening slots formed to be alignable with a locking tab.

The term "fill material" as used herein can refer to particulate material, such as aggregate, such as gravel, sand, mulch, recycled rubber particles, recycled glass pieces, grass, sod, and wood chips.

The term "flex joint" as used herein can refer to a piece of polymer, rubber, or other expandable material that can not only support a load but deform slightly and then return to the original shape upon release of the load. Flex joints can be positioned between flex joint connection cells to expand and retract. Some flex joints can have an "S" shape, a "U" shape or another curvilinear shape.

The term "flex joint connection cells" as used herein can refer to connected cells in a permeable paver that have a flex joint extending from an outer cell surface, and can expand and retract when load or heat, such as the sun, is applied to the permeable paver directly from a person or a truck or car or other source.

The term "housing" as used herein can refer to a transparent housing, or a translucent housing which is capable of allowing visible light or infrared frequencies to pass through the housing. In embodiments, the housing of the replaceable lighting module can include, optionally, a portion covered with a reflective paint or reflective material that provides additional reflected lumens to the preset geographic area without using additional energy from the power source connected to the replaceable lighting module.

The term "light source" as used herein can refer to a light emitting diode, a series of connected light bulbs that provide at least 5 lumens to 2000 lumens. Optionally, a fiberglass reinforced or metal clad circuit board can be used to support the LED or other type of light source. The metal clad circuit board can have printed circuits on the board which integrate the entire controller.

The term "load" as used herein can refer to pressure in pounds per square inch (psi) that is applied onto the permeable paver, such as, the psi applied by an 80 pound child or the psi applied by a 40 ton truck. The permeable pavers are designed to support transitory or stationary loads of the 40 ton truck without deforming.

The term "locking tabs" as used herein can refer to protrusions that extend from a connected cell to engage another permeable paver than the permeable paver with the integral locking tab.

The term "parking lot space" as used herein can refer to a marked area for one moving vehicle, such as a car, truck, trailer, golf cart, motorcycle, connected truck and trailer, recreational vehicle, which is out of a lane of transit and enables a driver to leave the vehicle for at least a short period of time.

The term "permeable paver" as used herein can refer to a structure configured to hold dirt, gravel, grass, clay, mulch, and allow water to trickle through the structure and fill material.

The term "power supply" as used herein can refer to an on permeable paver or off permeable paver power source, such as a hybrid generator that provides 120 volt A/C current with a combination of wind and gas power. In embodiments, the power supply can be stepped down with a transformer to a 12 volt power supply. In embodiments, the power supply can come from the local grid, or be a free standing separate power supply. Two or more power supplies can be used in series or in parallel with the permeable paver and modular light system. In embodiments, the power supply can be solar powered, wind powered, hydroelectrically powered, or powered by wires from a local power grid.

The term "preset geographic area" as used herein can refer a particular area or group of areas, physically connected or in communication with each other through a network, such as a parking lot space, a traffic lane, golf cart trails, natural trails, bike trails, running trails, stadium parking, large concert and expo venue sites, airports, train stations, hotel parking lots, fire lanes and exit zones from theme parks.

The term "quick install and quick release" as used herein can refer to the quickness a replaceable lighting module can be popped into a cell or popped out of a cell, such as within 30 seconds to 2 minutes only using a screwdriver, scissors, a knife or just unassisted human fingers.

The term "replaceable lighting module" as used herein can refer to a light, which can be contained in a housing that can connect to a power supply and can easily be installed or removed from a portion of the permeable paver. In embodiments, the entire replaceable lighting module can pop in or pop out of a connected cell of a permeable paver. In lumens, each replaceable lighting module can vary from 25 lumens to 4000 lumens. The replaceable lighting module can be a back illuminated lighting module. The replaceable lighting modules can be connected in series, such as strings. In other embodiments, the replaceable lighting modules can be connected in parallel. Each replaceable lighting source can be from 40 to 200 milliamps, such as 65 to 100 milliamps.

The term "traffic lane" as used herein can refer to a lane of a thoroughfare, such as a roadway, an entrance ramp, a drive lane within a parking lot, a feeder road to another road, an access road, or a lane deviation within a roadway due to maintenance or other road work.

Turning now to the Figures, FIG. 1A depicts a top view of a paver according to one or more embodiments.

In embodiments, the permeable paver and modular light system can mark at least one of: a parking lot space and a traffic lane using a paver 10a.

The paver 10a can be made from a plurality of different types of cells connected to each other, to flex joints 24a-24i, or to both.

The paver 10a can have a first side 12, a second side 14 opposite the first side 12, a third side 16 between the first side 12 and the second side 14, and a fourth side 18 between the first side 12 and the second side 14 opposite the third side 16.

The paver 10a can have a plurality of outer flex joint connection cells 26a-26h. Each outer flex joint connection cell 26a-26h can engage a flex joint 24a-24i from the plurality of flex joints 24a-24i.

Each outer flex joint connection cell 26a-26h can have an outer flex joint connection cell outer surface 27a-27h.

In embodiments, the paver 10a can have a plurality of outer three connection cells 30a-30h.

Each outer three connection cell 30a-30h can be connected to one of the outer flex joint connection cells 26a-26h.

Each outer three connection cell can have an outer three connection cell outer surface 29a-29h.

According to one or more embodiments, the paver 10a can have a plurality of outer two connection cells 32a-32d.

Each outer two connection cell 32a-32d can connect to two adjacent outer three connection cells 30a-30h.

Each outer two connection cell can have an outer two connection cell outer surface 31a-31d.

According to one or more embodiments, the paver 10a can have a plurality of inner single flex joint connection cells 34a-34h.

Each inner single flex joint connection cell 34a-34h can be connected to one of the flex joints 24a-24i.

According to one or more embodiments, the paver 10a can have a plurality of inner dual flex joint connection cells 36a-36d.

Each inner dual joint connection cell can engage two flex joints 24a-24i simultaneously.

The paver 10a can have a plurality of inner four connection cells 38a-38d.

Each of the inner four connection cells 38a-38d can connect to a pair of outer three connection cells 30a-30h and to a pair of inner single flex joint connection cells 34a-34h.

In embodiments, the paver 10a can have a first group of a plurality of X-shaped anchors 62a-62h in each outer flex joint connection cell 26a-26h.

In embodiments, the paver 10a can have a second group of a plurality of X-shaped anchor 63a-63d in each inner dual flex joint connection cell 36a-36d.

In embodiments, the paver 10a can have a third group of a plurality of X-shaped anchor 64a-64d in each outer two connection cell 32a-32d.

In embodiments, the paver 10a can have a fourth group of a plurality of X-shaped anchor 65a-65d in each inner four connection inner cells 38a-38d.

In embodiments, the paver can have the plurality of outer flex joint connection cells 26a-26h connecting adjacent cells at one of the clock positions: a 12 o'clock position, a 3 o'clock position, a 6 o'clock position and a 9 o'clock position.

In embodiments, the paver can have the plurality of outer three connection cells 30a-30h connected to one adjacent outer flex joint connection cell 26a-26h, one adjacent outer two connection cell 32a-32d and one adjacent inner four connection cell 38a-38d at one of the clock positions: a 12 o'clock position, a 3 o'clock position, a 6 o'clock position and a 9 o'clock position.

In embodiments, the paver can have the plurality of outer two connection cells 32a-32d connected to two adjacent outer three connection cells 30a-30h at one of the following clock positions on the outer surface of each cell: a 12 o'clock position, a 3 o'clock position, a 6 o'clock position and a 9 o'clock position.

In embodiments, the paver can have one of the plurality of inner single flex joint connection cells connected to one of the flex joints at a clock position on the outer surface of each inner single flex joint connection cell that is at one of the clock positions: a 12 o'clock position, a 3 o'clock position, a 6 o'clock position or a 9 o'clock position.

In embodiments, the paver can have at least one of the plurality of inner dual flex joint connection cells 36a-36d connected to a flex joint on the outer surface of each inner dual flex joint connection cell at one of the clock positions: a 12 o'clock position, a 3 o'clock position, a 6 o'clock position and a 9 o'clock position.

In embodiments, the paver can have the inner four connection cells 38a-38d connected to adjacent cells at a clock position on the outer surface of each cell at one of the clock positions: a 12 o'clock position, a 3 o'clock position, a 6 o'clock position and a 9 o'clock position.

According to one or more embodiments, the paver 10a can have a plurality of locking tabs 42a-42g extending from the first side 12 and the third side 16 of the paver.

The plurality of connected outer three connection cells, the plurality of outer two connection cells, and the plurality of outer flex joint connection cells 26a-26h can have spaces 9a and 9b formed between the cells.

In embodiments, each cell can have an inner flange 60a, which is depicted on an outer two connection cell 32a. If used, each inner flange 60a can extend toward a center point 83a of each cell. If used, each inner flange can extend from the bottom of the paver.

FIG. 1B depicts a side view of the second side 14 of the paver according to one or more embodiments.

According to embodiments, the paver 10a can have a plurality of fastening slots 40a-40f formed partially through the cell outer surface of the cells of the second side 14.

In embodiments, the plurality of fastening slots 40a-40f can cut from the bottom 22 of the paver 10a partially through the outer surface towards the top 20 of the paver.

Figure 1C:
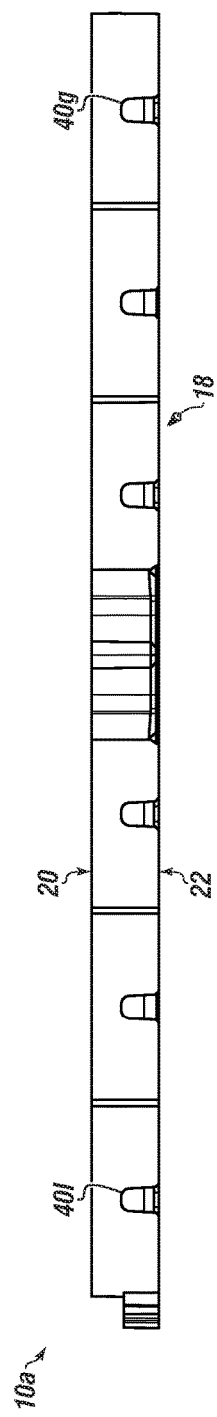
FIG. 1C depicts a side view of a fourth side of the paver according to one or more embodiments.

FIG. 1C depicts a side view of the fourth side 18 of the paver according to one or more embodiments.

The paver 10a can have a plurality of fastening slots 40g-40l formed partially through the cell outer surface of cells that create the fourth side 18 of the paver 10a.

In embodiments, the plurality of fastening slots 40g-40l can be cut from the bottom 22 partially through the outer surface towards the top 20.

Figure 1D:
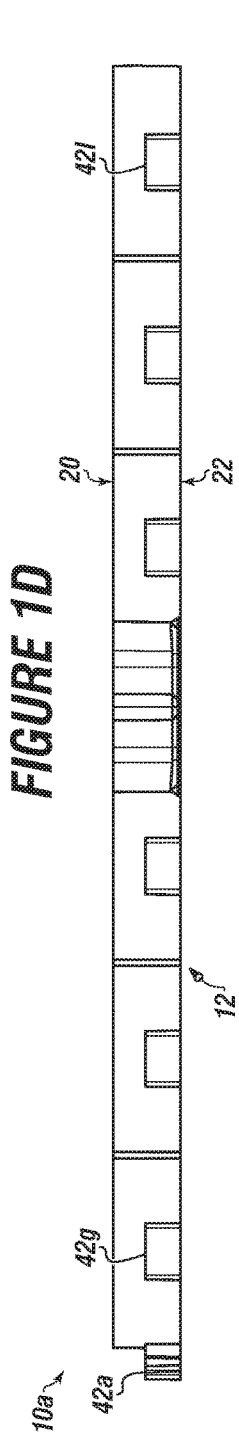
FIG. 1D depicts a side view of a first side of the paver according to one or more embodiments.

FIG. 1D depicts a side view of the first side 12 of the paver 10a according to one or more embodiments.

The plurality of locking tabs 42g-42l can be formed on the outer surface of the outer cells extending from the bottom 22, opposite the top 20, of the paver 10a. Locking tab 42a is also shown.

Figure 1E:
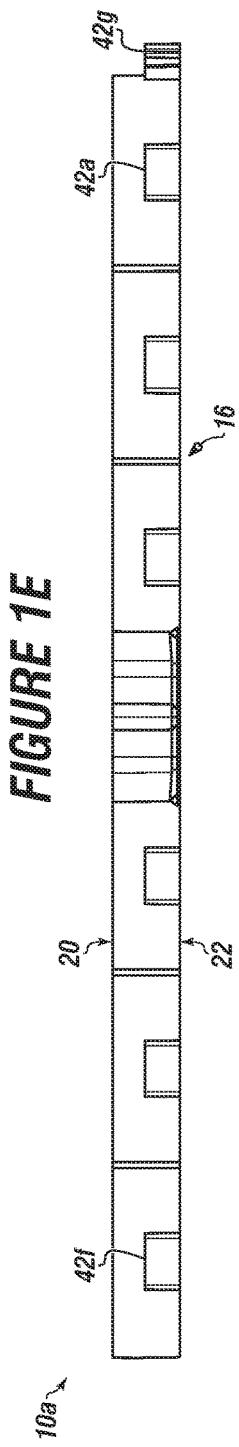
FIG. 1E depicts a side view of a third side of the paver according to one or more embodiments.

FIG. 1E depicts a side view of the third side 16 of the paver 10a according to one or more embodiments.

The plurality of locking tabs 42a-42f can extend from each outer surface of cells extending from the bottom 22, opposite the top 20, of the paver 10a. Locking tab 42g is also shown.

The locking tabs of the paver can interlock with the fastening slots of an adjacent paver to create a roadway, trail, or similar traffic surface by the interconnected pavers when filled with particulate, grass, pebbles or the like.

FIG. 2 depicts a detail of an inner surface of an outer three connection cell 30d of the paver with a replaceable lighting module 110.

In embodiments, at least one replaceable lighting module 110 or a plurality of replaceable lighting modules can be insertable into the cells to provide parking guidance to users, such as marking edges of parking spaces when the lights are illuminated at night or simply present during the date. This use of a replaceable lighting module 110 enables a user to avoid the need for reflective painting or parking light poles with lights.

An inner surface 45 of the outer three connection cell 30d is shown with a fastening slot 40d.

The fastening slot 40d can be tapered from the bottom of the cell towards the top.

In embodiments, each fastening slot 40d can have an alignment opening 54 formed in the fastening slot 40d for engaging a locking tab.

In embodiments, each fastening slot can have a tensioning rib 56 adjacent the fastening slot. In embodiments, a tensioning rib 56 can be positioned on both sides of the fastening slot.

Figure 3:
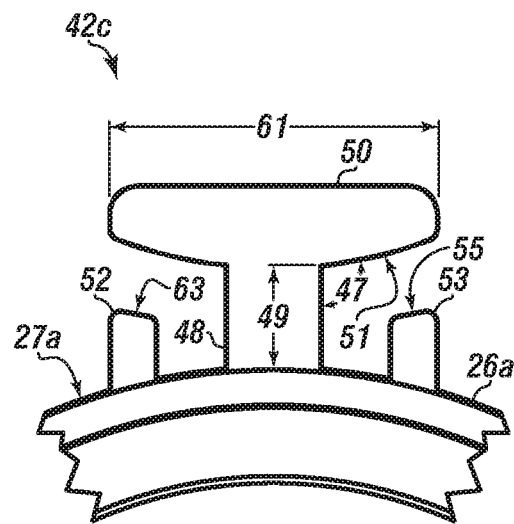
FIG. 3 depicts a detail of a locking tab usable in the paver according to one or more embodiments.

FIG. 3 depicts a detail of a locking tab 42c according to one or more embodiments.

The locking tab 42c can have a shaft 48 with a shaft length 49 connected to the outer surface 27a of one of the outer flex joint connection cells 26a.

The locking tab 42c can have a head 50 connected to the shaft 48 at an angle 47. The angle 47 can be an angle from 80 degrees to 110 degrees from an axis of the shaft 48.

The head 50 can have a head length 61. The head length 61 for the locking tab 42c can be larger than the shaft length 49.

The head 50 can have a load surface 51. The load surface 51 can have a slope that matches an inner surface curvature of a cell enabling the head to mate with a fastening slot.

A first sloped edge 52 can extend from the outer surface 27a of the outer flex joint connection cell 26a. The first sloped edge 52 can be parallel with and spaced apart from the shaft 48 and also in a spaced apart relationship to the head 50.

An outer edge 63 of the first sloped edge 52 can have a curvature complimentary to the outer surface 27a curvature of a cell with a fastening slot into which the head 50 interlocks.

The outer length aspect of the first sloped edge 52 can have a width larger where the first sloped edge 52 attaches to the outer surface 27a than the width at the outer edge 63. The first sloped edge 52 can be tapered in embodiments.

A second sloped edge 53 can extend from the outer surface 27a of the outer flex joint connection cell 26a.

The second sloped edge 53 can be parallel with and spaced apart from the shaft 48 and can also be in a spaced apart relationship to the head 50.

The second sloped edge 53 can be opposite the first sloped edge 52.

An outer edge 55 of the second sloped edge 53 can have a curvature complimentary to the outer surface 27a curvature of a cell with a fastening slot into which the head 50 interlocks.

Figure 4:
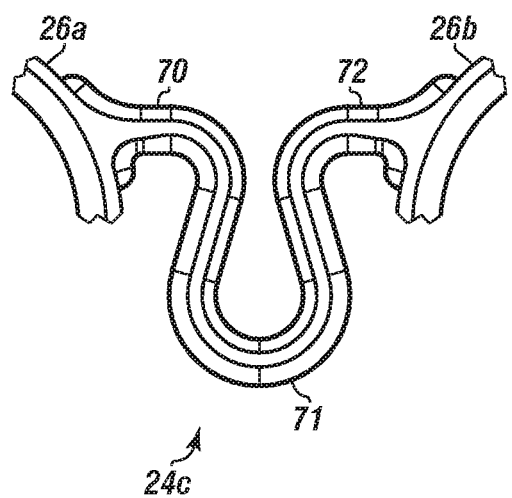
FIG. 4 depicts a detail of a flex joint usable in the paver according to one or more embodiments.

FIG. 4 is a detail of a flex joint 24c for use in the pavers according to one or more embodiments.

In embodiments, each flex joint 24c can have a first arm 70, a body 71, and a second arm 72.

In embodiments, the body 71 can be twice as long as either the first arm 70 or the second arm 72.

The first arm 70 can connect to the outer flex joint connection cell 26a and the second arm 72 can connect to the outer flex joint connection cell 26b.

In embodiments, the body 71 can be U shaped.

Figure 5:
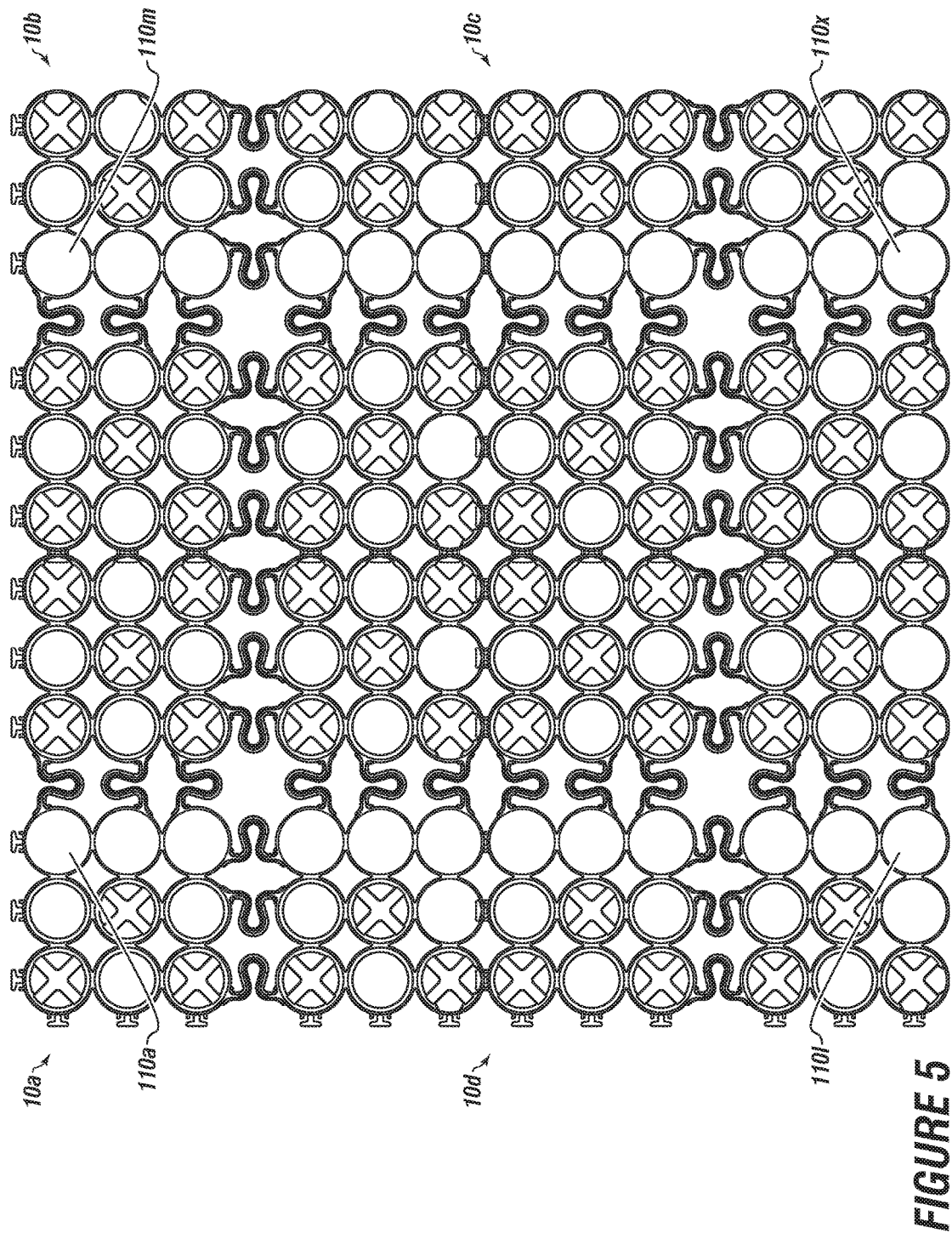
FIG. 5 depicts four interlocked pavers with replaceable lighting modules according to one or more embodiments.

FIG. 5 depicts an assembly of a plurality of pavers 10a-10d connected together according to one or more embodiments.

The plurality of pavers 10a-10d can be connected together using the locking tabs and the fastening slots.

A plurality of replaceable lighting modules 110a-110x are shown mounted in the pavers forming a traffic lane.

Figure 6:
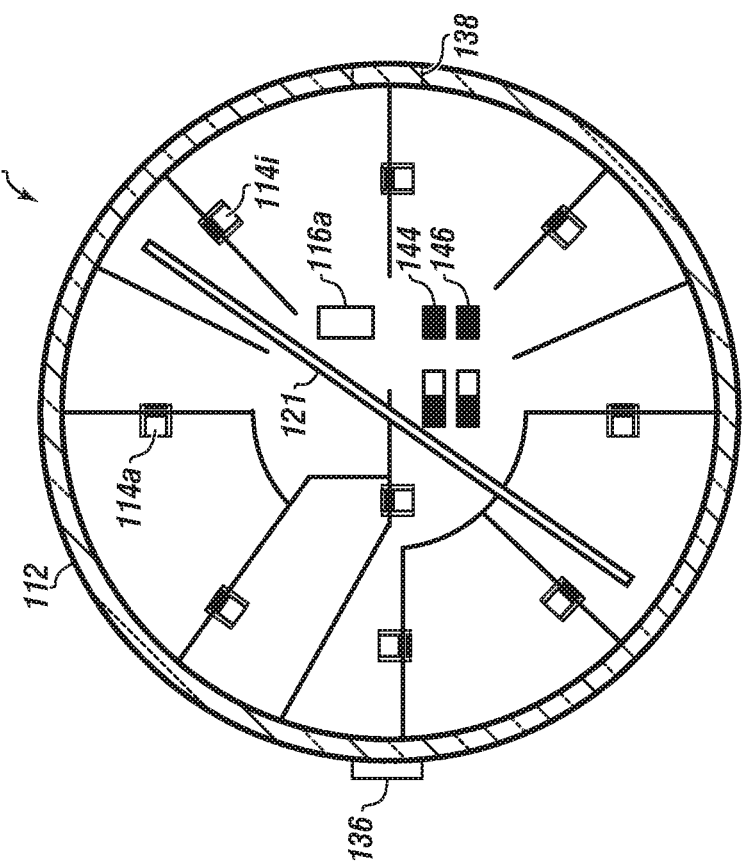
FIG. 6 is a detailed top view of the at least one replaceable lighting module according to one or more embodiments.

FIG. 6 is a detailed top view of replaceable lighting module 110 according to one or more embodiments.

The at least one replaceable lighting module 110 or the plurality of replaceable lighting modules can have a housing 112, which in embodiments, can be domed shaped.

The at least one replaceable lighting module 110 can have at least one light source 114a-114i mounted within the housing 112.

Each paver can comprise an extending tab 136 or a slot 138 adapted to secure at least one replaceable lighting module 110 to one of the cells of the paver.

In embodiments, the at least one replaceable lighting module 110 can have a reflector 121 for orienting the at least one light source or multiple light sources in a specific direction.

In embodiments, a receiver 144 can be in communication with a transmitter 146. The transmitter 146 can be further in communication with a network.

In embodiments, the replaceable lighting module 110 can have at least one power supply 116, which can be located within the housing 112.

Figure 7:
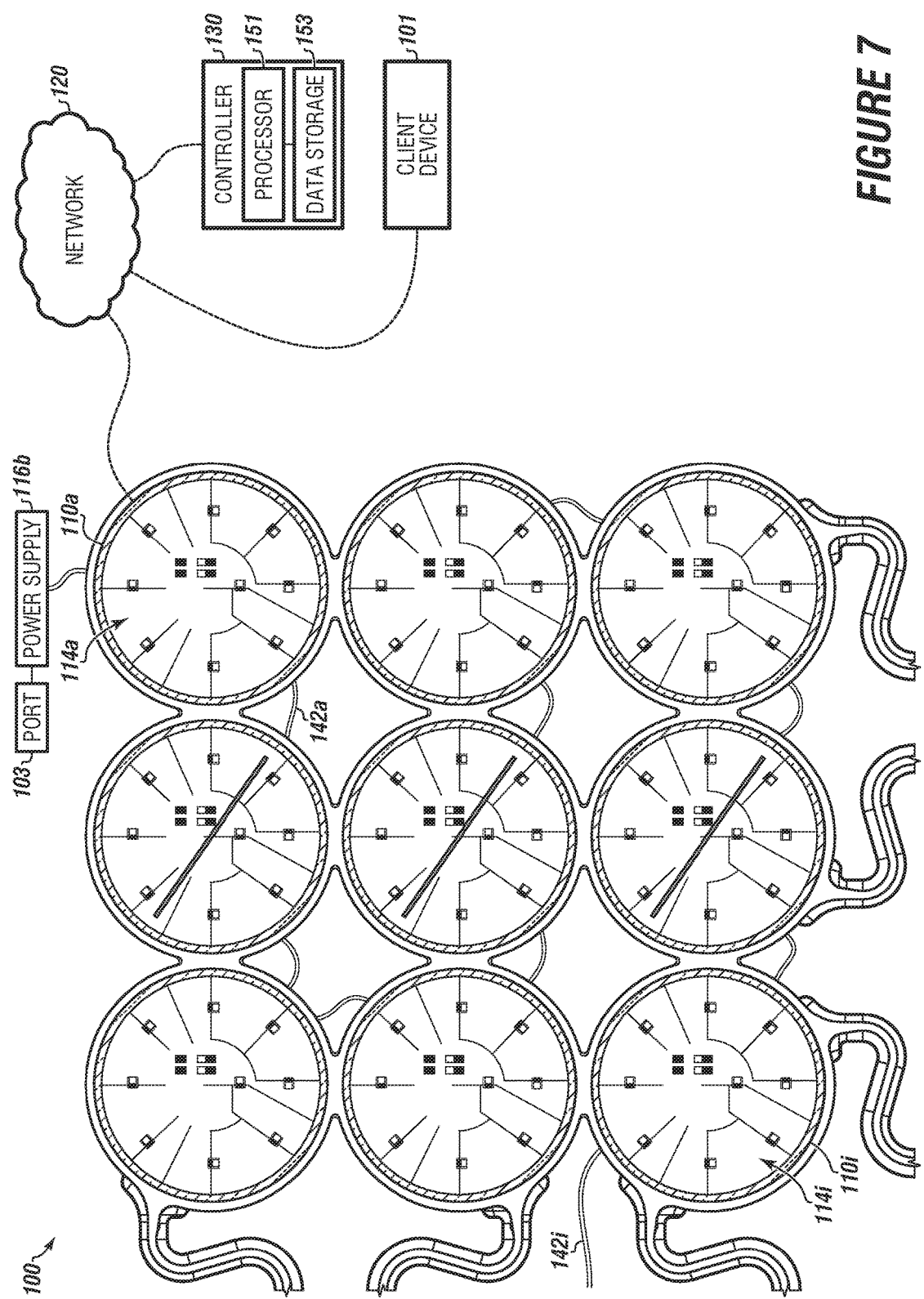
FIG. 7 is a diagram of the permeable paver and modular light system according to one or more embodiments.

FIG. 7 is a diagram of the permeable paver and modular light system 100 according to one or more embodiments.

The permeable paver and modular light system 100 can be connected to or in communication either wirelessly or wired with a network 120, at least one client device 101, or both the network 120 and the at least one client device 101.

A controller 130, which can be a computer, a laptop, a tablet computer, a central processing unit, or any known applicable device, can be in communication with the at least one power supply 116b.

The controller 130, which can be in communication with the at least one power supply 116 and at least one replaceable lighting module or the plurality of replaceable lighting modules 110a-110i, can be configured to turn on and off at least one replaceable lighting module or the plurality of replaceable lighting modules, change a color of at least one replaceable lighting module or the plurality of replaceable lighting modules, illuminate a configuration of at least one replaceable lighting module or the plurality of replaceable lighting modules based on a stored configuration, and change the illuminated configuration of at least one replaceable lighting module or the plurality of replaceable lighting modules.

The controller can include a processor 151 and a data storage 153.

The permeable paver and modular light system can have a charging port 103 connected to the at least one power supply 116b enabling at least one client device 101 to be recharged using the charging port. In embodiments the charging port can enable at least one replaceable lighting module or the plurality of lighting modules to be recharged.

The plurality of replaceable lighting modules 110a-110i can be electrically connected, such as in parallel, to the controller 130.

At least one power transmission means 142a-142i, which can be wires, can transmit power from the at least one power supply 116 to each replaceable lighting module or the plurality of lighting modules 110a-110i.

The at least one light source, shown here as a plurality of light sources 114a-114i can be used.

Figure 8:
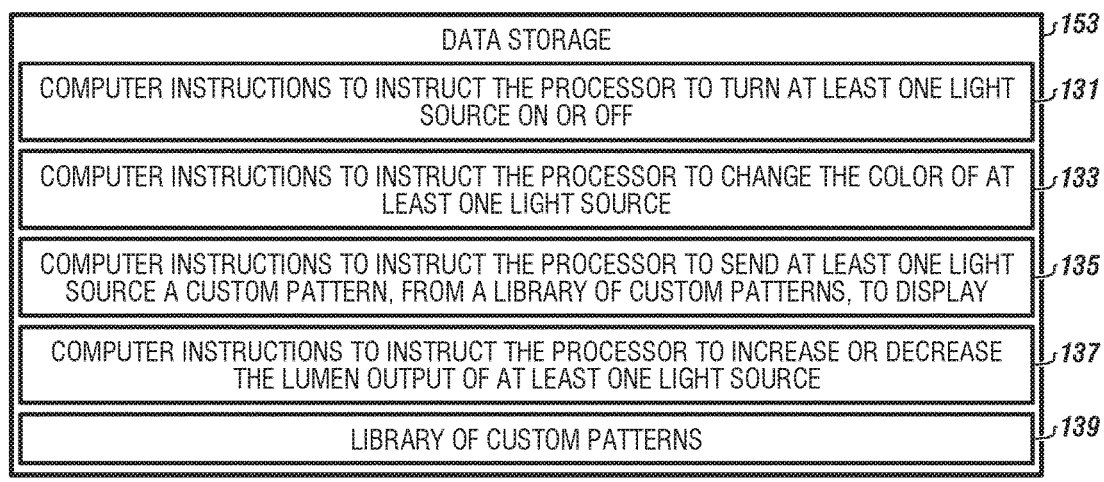
FIG. 8 depicts a plurality of computer instructions contained in data storage according to one or more embodiments.

FIG. 8 depicts a plurality of computer instructions contained in the data storage according to one or more embodiments.

The data storage 153 can contain computer instructions to instruct the processor to turn at least one light source on or off, depicted in box 131.

The data storage 153 can contain computer instructions to instruct the processor to change the color of at least one light source, depicted in box 133.

The data storage 153 can contain computer instructions to instruct the processor to send at least one light source a custom pattern, from a library of custom patterns, to display, depicted in box 135.

The data storage 153 can contain computer instructions to instruct the processor to increase or decrease the lumens output of at least one light source, depicted in box 137.

The data storage 153 can contain the library of custom patterns 139.

In embodiments, the library of custom patterns can include customized patterns, or patterns that blink to a sound sequence, blink at a set time of day, blink to indicate at least one of: a start and an end of an event, color coding certain parking lot spaces for prioritized vehicles, spell out a message using the at least one light source, direct emergency vehicle traffic, provide directions to a vehicle based on a mobile application connected to a map application using a global positioning system signal from a user's cellular phone, indicate open parking spaces in row of parking spaces, direct vehicles to open parking spaces using the permeable paver and modular light system.

In embodiments, the data storage can have computer instructions to connect to a ticket dispenser and payment collector, such as to a parking garage.

Figure 9:
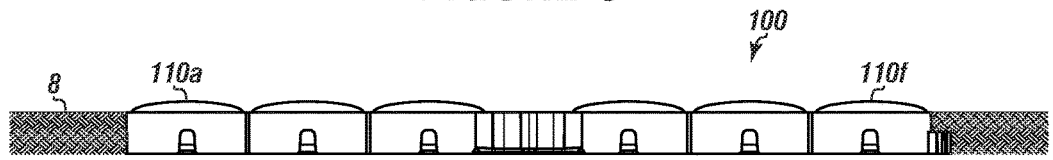
FIG. 9 depicts a side view of the permeable paver and modular light system according to one or more embodiments.

FIG. 9 depicts a side view of the permeable paver and modular light system according to one or more embodiments.

The permeable paver and modular light system 100 is shown with the plurality of replaceable lighting modules 110a-110f.

The permeable paver and modular light system shows a surface 8 when the paver is filled with dirt, particulate.

In embodiments, the permeable paver and modular light system when assembled can support from 50,000 lbs/ft2 to 1,000,000 lbs/ft2.

In embodiments, the permeable paver and modular light system can use a plurality of replaceable lighting modules, wherein each replaceable lighting module or the plurality of replace lighting modules can have at least one light source configured to change color, blink on and off using custom created patterns or stored sequences in the controller or data storage, and increase or decrease in lumens output.

In embodiments, the permeable paver and modular light system can be a domed structure. The housing can allow vehicular traffic to drive across the domed structure without deforming or stopping passage of the vehicular traffic.

In embodiments, the permeable paver and modular light system can have a housing that is clear, opaque, or colored.

In embodiments, the permeable paver and modular light system can have a power supply that is either AC current, DC current or can switch from one current to the other.

In embodiments, the permeable paver and modular light system can be configured to blink to a sound sequence, blink at a set time of day, blink to indicate at least one of a start and an end of an event, color coding certain parking lot spaces for prioritized vehicles, spell out a message using the light source, direct emergency vehicle traffic, provide directions to a vehicle based on cell phone application connected to a map application using a global positioning system signal from a user's cellular phone, indicate open parking spaces, direct vehicles to open parking spaces, and connect to a ticket dispenser and payment collector.

In embodiments, the plurality of replaceable lighting modules can be in a wired or a wireless communication with the controller.

In embodiments, the network can be any known network in the industry, such as a global communication network, the internet, a local area network, a wide area network, a satellite network, or combinations thereof.

In embodiments, the permeable paver and modular light system can use a power supply can be a solar panel, a fuel cell array, a rechargeable battery storage system, a battery, a generator of a local electrical grid, or combinations thereof.

The following are examples of the installation and use of the permeable paver and modular light system for a preset geographic area while supporting a load from a person or vehicle without deforming, wherein the permeable paver and modular light system are not limited to the examples below.

Example 1

A customer wants to install a permeable paver and modular light system for a 10,000 person stadium.

The customer designs a parking lot and walkways. The customer chooses the sizes of the different pavers needed for the walkway (small pavers) and the parking lot (large pavers). The small and large pavers are each permeable pavers.

Each of his large permeable pavers has a plurality of connected cells forming a first side, a second side, a third side, and a fourth side. Each connected cell is configured to contain fill material. The large permeable paver can have a width of 24 inches and a length of 24 inches.

The customer chooses large permeable pavers with 8 outer three connection cells, 4 outer two connection cells, and 8 outer flex joint connection cells, with spaces formed between cells, the connection cells and spaces configured to contain fill material.

The large permeable pavers of this example each have one locking tab extending from each first side and each third side of an outer connection cell for a total of 12 locking tabs.

The large permeable paver has one fastening slot formed partially through the outer connection cells that form the second side and the fourth side of each permeable paver, for a total of 12 fastening slots.

The locking tabs for each permeable paver engage a fastening slot of an additional permeable paver.

Each permeable paver creates a surface for supporting a load that has a plurality of hollow spaces.

For 20 percent of the large pavers, the customer deciders to create parallel parking lighting effects. A replaceable lighting module in electric communication with a power supply for quick install and quick release is installed in parallel outer connected cells or connected cells in a select group of permeable pavers.

In this example the plurality of installed lights (linearly installed) for individual parking spaces are able to project a yellow colored light when the parking space is available and a red light when the parking space is occupied.

Each replaceable lighting module has a housing that is translucent. In this example, four LED lights are mounted within the housing (pre-mounted in the replaceable lighting module).

Each of the plurality of replaceable lighting modules is configured to be installed in one of the hollow spaces, which otherwise would contain fill material.

Aggregate is used as the fill material in hollow spaces and other cells, such as flex joint cells, of the permeable large pavers that are not occupied by a replaceable lighting module.

The customer connects his controller to a 120 volt a power supply, which can be a local power supply.

The customer configures the controller to not only turn on and off strings of connected replaceable lighting modules, but also to electronically change the yellow color of a string of replaceable lighting modules to red on actuation from a sensor that detects a car in the parking space or on actuation from a master control that turns groups of parking spaces red, such as to create a VIP section for parking at the venue.

Also, the customer installs computer instructions to generate traffic flow arrows using the processor in the controller, causing illumination of replaceable lighting modules, which has the appearance of runway lights.

The walkway is created using each of the small permeable pavers with a plurality of connected cells forming a first side, a second side, a third side, and a fourth side. Each connected cell is configured to contain fill material.

The small permeable pavers have 6 outer three connection cells, 4 outer two connection cells, and 6 outer flex joint connection cells, with spaces formed between cells. The connection cells and spaces are configured to contain fill material. The diameter of each cell in the small permeable pavers is 50% of the large permeable pavers. The small permeable pavers can have individual cells with diameters of 2 inches. The large permeable pavers can have individual cells with diameters of 4 inches.

The small permeable pavers of this example each have one locking tab extending from each first side and each third side of an outer connection cell for a total of 8 locking tabs. The small permeable paver can have a width of 16 inches and a length of 16 inches.

The small permeable paver has one fastening slot formed partially through the outer connection cells that form the second side and the fourth side of each permeable paver, for a total of 8 fastening slots.

The lights can be installed in every other outer cell on one side of the paver and alternating with every other outer cell on an opposite side of the small paver.

The fill material for each cell of the walkway without a replaceable lighting module can be grass.

The walkway replaceable lighting modules can be connected to a wind turbine power supply.

Example 2

A customer wants to install a permeable paver and modular light system for a fire lane for emergency vehicles, such as fire trucks at an industrial plant.

The customer designs a roadway with only large permeable pavers. Each of the large permeable pavers has a plurality of connected cells forming a first side, a second side, a third side, and a fourth side, each connected cell is configured to contain fill material. The fill material for the emergency vehicles will be recycled glass.

Only large permeable pavers are used, which have 16 outer three connection cells, 4 outer two connection cells, and 16 outer flex joint connection cells, with spaces formed between cells, the connection cells and spaces configured to contain fill material.

The large permeable pavers of this example each have one locking tab extending from each first side and each third side of an outer connection cell for a total of 24 locking tabs.

The large permeable paver has one fastening slot formed partially through the outer connection cells that forms the second side and the fourth side of each permeable paver, for a total of 24 fastening slots.

The locking tabs for each permeable paver engage a fastening slot of an additional permeable paver.

Each permeable paver creates a surface for supporting a load that has a plurality of hollow spaces. The load is at least a fire truck, such as a hook and ladder articulated fire truck which can access the industrial plant quickly in case of an emergency.

50 percent of the large permeable pavers were used to create a marked roadway, which clearly winds through the industrial plant avoiding overhanging pipes that would otherwise prevent a hook and ladder with a driver from moving quickly through the site.

In embodiments, 10 percent to 100 percent of the permeable pavers can contain at least one replaceable lighting module.

A replaceable lighting module in electric communication with a power supply for quick install and quick release is installed in series in every other outer connected cell of the large permeable pavers.

In this example, the plurality of installed lights (linearly installed) is safety orange lights, which are easy to see and clear markers compared to other lights at the site.

Each replaceable lighting module the housing is clear. In this example, 8 LED lights are mounted within the housing (pre-mounted in each replaceable lighting module).

The customer uses recycled small particle size glass, less than 2 microns in diameter, as the fill material in the hollow spaces and cells without the LED lights, such as flex joint cells, of the permeable pavers.

The customer connects his controller to a 120 volt diesel electric generator, which powers both the controller and the lights.

The customer configures the controller to not only turn on and off strings of connected replaceable lighting modules but also to flash to clearly show which direction to drive, similar to chase lights.

Because the system is pre-installed at the industrial site, the system help prevent injury and deaths from occurring in the event of an industrial accident or hurricane as the permeable paver and light system is permeable to water, preventing pools of standing water.

In embodiments, the permeable paver and modular light system can include a layer of rock beneath the connected permeable pavers. Namely, a clean angular rock layer can be formed under the plurality of connected permeable pavers. The clean angular rock can have diameters of at least 0.5 inch.

In embodiments, the permeable paver and modular light system can include a lighting cover over the housing, which provides a lighting effect to a subset area of the preset geographic area.

In embodiments, the permeable paver and modular light system can include computer instructions in the controller of instruct a processor in the controller to change the configuration at either a preset time, or upon command from a user via a client device.

While these embodiments have been described with emphasis on the embodiments, it should be understood that within the scope of the appended claims, the embodiments might be practiced other than as specifically described herein.

What is claimed is:

1. A permeable paver and modular light system for a preset geographic area while supporting a load without deforming, the permeable paver and modular light system comprising:
   a. a plurality of permeable pavers, each permeable paver comprising:
      (i) a plurality of connected cells forming a first side, a second side, a third side, and a fourth side, each connected cell configured to contain fill material;
      (ii) a plurality of locking tabs extending from the first side and the third side;
      (iii) a plurality of outer three connection cells, a plurality of outer two connection cells, and outer flex joint connection cells, with spaces formed between cells, the connection cells and spaces configured to contain the fill material; and
      (iv) a plurality of fastening slots formed partially through the cells that form the second side and the fourth side of each permeable paver, wherein the plurality of locking tabs for each permeable paver engages the plurality of fastening slots of an additional permeable paver, each permeable paver further configured to form a surface for supporting the load, wherein each permeable paver can be connected together;
   b. at least one replaceable lighting module in electric communication with a power supply for quick install and quick release from at least one of: the connected cells of the plurality of connected cells and the connection cells of the permeable paver, each replaceable lighting module comprising:
      (i) a housing; and
      (ii) at least one light source mounted within the housing, each of the plurality of replaceable lighting modules configured to replace the fill material in at least one of: the connection cells and the plurality of connected cells; and
   c. a controller in communication with the power supply and with the plurality of replaceable lighting modules, wherein the controller is configured to:

(i) turn on and off the at least one replaceable lighting module;
(ii) electronically change a color of the at least one replaceable lighting module; and
(iii) illuminate a configuration using the at least one replaceable lighting modules based on a stored configuration in the controller.

2. The permeable paver and modular light system of claim 1, wherein each permeable paver comprises:
   a. a plurality of flex joints connecting to one of the outer flex joint connection cells and wherein the plurality of outer two connection cells share a common wall with a pair of the outer three connection cells;
   b. a plurality of inner single flex joint connection cells, each inner single flex joint connection cell connected to one of the flex joints and configured to contain the fill material or one of the replaceable lighting modules of the plurality of replaceable lighting modules;
   c. a plurality of inner dual flex joint connection cells, each inner dual flex joint connection cell engaging a pair of the flex joints simultaneously and configured to contain the fill material or one of the replaceable lighting modules of the plurality of replaceable lighting modules; and
   d. a plurality of inner four connection cells, each inner four connection cell connecting to a pair of the outer three connection cells and a pair of the inner single flex joint connection cells and configured to contain the fill material or one of the replaceable lighting modules of the plurality of replaceable lighting modules.

3. The permeable paver and modular light system of claim 1, wherein each permeable paver comprises an extending tab or a slot adapted to secure the at least one replaceable lighting module to one of the connection cells or connected cells of the plurality of the connected cells of each permeable paver.

4. The permeable paver and modular light system of claim 1, wherein each permeable paver comprises a power transmission means for transmitting power from the power supply to the at least one replaceable lighting module.

5. The permeable paver and modular light system of claim 1, wherein the at least one replaceable lighting module and each permeable paver can support from 50,000 lbs/ft$^2$ to 1,000,000 lbs/ft$^2$.

6. The permeable paver and modular light system of claim 1, wherein the at least one replaceable lighting module comprises a receiver in communication with a transmitter, wherein the transmitter is further in communication with a network.

7. The permeable paver and modular light system of claim 1, wherein the at least one light source of the at least one replaceable lighting module is configured to:
   a. blink on and off using custom created patterns or stored sequences in a library of custom patterns or stored in the controller; and
   b. increase or decrease lumens output.

8. The permeable paver and modular light system of claim 1, wherein the at least one replaceable lighting module comprises a reflector for orienting the at least one light source in a specific direction.

9. The permeable paver and modular light system of claim 1, wherein the housing is a domed structure that allows vehicular traffic to drive across the domed structure without deforming or stopping passage of the vehicular traffic.

10. The permeable paver and modular light system of claim 1, wherein the at least one power supply is AC current or DC current.

11. The permeable paver and modular light system of claim 1, wherein the controller is in communication with a processor and a data storage, wherein the data storage comprising a plurality of computer instructions to instruct the processor to:
    a. turn the at least one light source on or off;
    b. change the color of the at least one light source;
    c. send the at least one light source a custom pattern, from a library of custom patterns located in the data storage, to display the custom pattern; and
    d. increase or decrease lumens output of the at least one light source.

12. The permeable paver and modular light system of claim 1, wherein the at least one replaceable lighting module is in a wired or a wireless communication with the controller.

13. The permeable paver and modular light system of claim 6, wherein the network is a global communication network, an internet, a local area network, a wide area network, a satellite network, or combinations thereof.

14. The permeable paver and modular light system of claim 1, wherein the at least one power supply is a solar panel, a fuel cell array, a rechargeable battery storage system, a battery, a generator of a local electrical grid, or combinations thereof.

15. The permeable paver and modular light system of claim 1, comprising a charging port connected to the at least one power supply enabling at least one client device to be recharged using the charging port.

16. The permeable paver and modular light system of claim 1, wherein each permeable paver is permeable to water.

17. The permeable paver and modular light system of claim 1, wherein the preset geographic area is a parking lot space or a traffic lane.

18. The permeable paver and modular light system of claim 1, further comprising a clean angular rock layer formed under the plurality of connected permeable pavers, the clean angular rock having individual rock diameters of at least 0.5 inch.

19. The permeable paver and modular light system of claim 1, comprising a lighting cover engageable over the housing, the lighting cover configured to provide a lighting effect to the preset geographic area.

20. The permeable paver and modular light system of claim 1, comprising computer instructions in the controller to instruct a processor in the controller to change the illumination configuration of all or a portion of the plurality of replaceable lighting modules at either a preset time, or upon command from a user via a client device.

* * * * *